United States Patent
McCauley

(10) Patent No.: US 6,284,207 B1
(45) Date of Patent: Sep. 4, 2001

(54) PROCESS FOR PRODUCING HIGH SURFACE AREA MATERIAL BY CONTROLLED LEACHING OF BLAST FURNACE SLAG

(76) Inventor: John R. McCauley, 2316 Bollinger Mill Rd., Finksburg, MD (US) 21048

(*) Notice: Subject to any disclaimer, the term of this patent is extended or adjusted under 35 U.S.C. 154(b) by 0 days.

(21) Appl. No.: 09/655,027

(22) Filed: Sep. 5, 2000

Related U.S. Application Data

(63) Continuation-in-part of application No. 09/138,497, filed on Aug. 24, 1998, now abandoned
(60) Provisional application No. 60/056,949, filed on Aug. 25, 1997.

(51) Int. Cl.$^7$ ............................... B01F 1/00; B01D 11/02
(52) U.S. Cl. .................. 423/132; 423/658.5; 423/626; 423/628; 423/328.1; 65/19; 65/31
(58) Field of Search .............................. 423/658.5, 132, 423/626, 628, 328.1; 65/19, 31

(56) References Cited

U.S. PATENT DOCUMENTS

| | | |
|---|---|---|
| 3,676,366 * | 7/1972 | Podschus et al. . |
| 4,017,425 * | 4/1977 | Shiao . |
| 4,142,994 * | 3/1979 | Alafandil . |
| 4,367,215 * | 1/1983 | Gjelsvik et al. . |
| 4,539,187 * | 9/1985 | Russ et al. . |
| 4,545,797 * | 10/1985 | Elattar . |
| 4,601,997 * | 7/1986 | Speronello . |
| 4,704,265 * | 11/1987 | Krohn et al. . |
| 4,803,188 * | 2/1989 | Aulich et al. . |
| 4,891,130 * | 1/1990 | Pitts . |
| 5,112,584 * | 5/1992 | Mejdell . |

* cited by examiner

*Primary Examiner*—Steven P. Griffin
*Assistant Examiner*—Christina Ildebrando
(74) *Attorney, Agent, or Firm*—Law Offices of Royal W. Craig

(57) ABSTRACT

A material with high surface area can be obtained through the partial or total removal of CaO and MgO by acid leaching of blast furnace slag. This is accomplished by an improved process for selective leaching of blast furnace slag and other solid solution materials by control of temperature during leaching, rate of addition of acid, type of the acid, concentration of the acid, and concentration of the slag in the slurry. When these variables are controlled as disclosed a hierarchy of dissolution occurs. The hierarchy begins with MgO, progresses to CaO, and is followed by $Al_2O_3$, and the rate of acid addition is slow and controlled so that alumina does not dissolve (thereby depriving the remaining silica has no acid sites or catalytic activity). By invoking the hierarchy one gains selectivity, and this can be used to convert blast furnace slag to a material with high surface area which may have applications as an absorbent could be economically feasible. The resulting material is also high in silica-alumina and low in alkali. This would make it an excellent raw material for catalyst synthesis.

12 Claims, 3 Drawing Sheets

PROCESS FOR PRODUCING HIGH SURFACE AREA MATERIAL BY CONTROLLED LEACHING OF BLAST FURNACE SLAG

CROSS-REFERENCE TO RELATED APPLICATIONS

The present application is a continuation-in-part of application Ser. No. 09/138,497, filed on Aug. 24, 1998, abandoned, which in turn derives priority from provisional application Ser. No. 60/056,949 filed Aug. 25, 1997.

BACKGROUND OF THE INVENTION

1. Field of the Invention

The present invention relates to selective leaching to obtain a residual material with improved properties and, more particularly, to selective leaching of the different components of blast furnace slag using a controlled process and array of chemicals to obtain a residual silica alumina framework which has considerable surface area and catalytic activity.

2. Description of the Background

The concept of conversion of an inert slag to a catalyst support having surface area and porosity is known in the art. For example, U.S. Pat. No. 4,545,797 to Elattar teaches a process for the manufacture of porous slag from inert slag. Elattar discloses the process for the manufacture of slag having high surface area comprising the following steps (i) calcining the slag (ii) grinding the calcined slag to a size 0.1–0.3 mm (iii) leaching the ground material with aqueous acid having a $pK_a$ of 1–5 or base having a $pK_b$ of about 2–6 or a combination thereof. The Elattar process is a one step non-selective leaching operation at an unspecified high temperature. This indiscriminate leaching at an indiscriminate temperature leaches out the desired alumina required for acid catalysis. Moreover, Elattar's leaching agents are NaOH or HF, both of which dissolve silica (see column 3, line 21). As a result, the end product of Elattar's process yields an unspecified framework with surface areas of 13.5 $m^2/g$ and having "macro-porosity" (therein defined as an average surface area of at least 200 $m^2/g$). The resulting slag, representing the synthesis of a high surface area material from an essentially zero porosity and non-existent surface area slag, can be used as a catalyst support, or in building materials, or in the ceramic industry.

There remains a need for a more controlled and selective process for slowly leaching undesired metal oxides in a controlled fashion. It is desirable to produce an end product having micro-porosity with surface areas an order of magnitude greater (between 500 and 200 $m^2/g$). In general, the smaller the pores, the greater the surface area, adsorption, and chemical reactivity/selectivity.

U.S. Pat. No. 4,803,188 to Aulich et al. discloses the synthesis of a heterogeneous catalyst based on silicon dioxide and incorporating other metal oxides insoluble in mineral acid. Mined silica is used as a starting material and to it glass-forming additives of aluminum oxide, carbonates of alkali and alkaline earth metals, and desired catalytically active metal oxides (e.g. oxides of iron or zinc) are added and the mixture is heated to form a homogenized melt which is converted to fiber form and the resulting fiber is treated with hot acid to leach out the glass forming additives and other impurities. The resulting porous silicate material has the desired catalytically active metals incorporated into its framework. The fusion of metal oxides having a soluble component and an insoluble component to synthesize a catalyst is also taught by Aulich et al. It is well known that alumina can be leached from amorphous $SiO_2/Al_2O_3$ (e.g., metakaolin clay) with acid yielding a silica with meso-porosity. Therefore, the Aulich method cannot produce a silica/alumina with micro-porosity. Aulich also has the disadvantage in that any occluded alkali metals would be unleachable and destructive to any surface area in high temperature applications.

In summary, neither of the processes of Elattar nor Aulich are capable of producing a silica/alumina micro-porous material, and neither patent teaches or suggests specific products that can be obtained by the selective and controlled removal of the calcium and/or magnesium oxides from blast furnace slag, nor the resulting hierarchy of dissolution from the controlled leaching, nor the improved properties such as greatly increased surface area that can be attained by giving one the choice and flexibility from hierarchical leaching.

SUMMARY OF THE INVENTION

It is, therefore, an object of the present invention to provide an improved controlled process for controlled selective leaching, and the resulting product is a residual material with improved properties including increased surface area and potential catalytic activity.

It is another object to provide a controlled process for selective leaching out of metal oxides from blast furnace slag using an array of chemicals to obtain a residual silica alumina framework with micro-porosity suitable for use as a catalyst or for catalyst support.

It is a specific object to effect controlled selective leaching in order to capitalize on the resulting hierarchy of dissolution, thereby allowing one the choice and flexibility as no other process can.

According to the present invention, the above-described and other objects are accomplished by providing various embodiments of an improved controlled process for leaching blast furnace slag and other solid solution materials, and the resulting products derived from the process. Blast furnace slag is a solid solution with a chemical composition based on $CaO+MgO+SiO_2+Al_2O_3=100\%$.

|                       | CaO  | MgO  | $SiO_2$ | $Al_2O_3$ |
| --------------------- | ---- | ---- | ------- | --------- |
| Mean Wt. %            | 40.8 | 10.1 | 37.8    | 11.3      |
| Standard Deviation %  | 4.6  | 4.4  | 2.6     | 2.8       |

Chemical concentrations less than 1% include oxides of iron, potassium, sodium, titanium, and elemental sulfur. In this invention the different components of the blast furnace slag are selectively leached using an array of chemicals to obtain useful materials. For example, acid leaching of the slag leaves a residual silica alumina framework which has considerable surface area and catalytic activity.

The improved process for leaching blast furnace slag and other solid solution materials generally comprises controlling the leaching by the controlling the following variables:

1. Temperature during leaching (should be ambient).
2. Rate of addition of acid (dropwise and slowly in order to maximize the removal of CaO and MgO and minimize the removal of $Al_2O_3$, preferably while monitoring the pH to ensure that it does not go below 2.0.)
3. Type of the acid (preferably HCl).
4. Concentration of the acid: 37% HCl 5. Concentration of the slag in the slurry: 4% to 10% granulated slag in water.

When these variables are controlled as shown a hierarchy of dissolution occurs. The hierarchy begins with MgO, progresses to CaO, and is followed by $Al_2O_3$, and the rate of acid addition is slow and controlled so that alumina does not dissolve (thereby depriving the remaining silica has no acid sites or catalytic activity). By invoking the hierarchy one gains the choice, flexibility and selectivity that no other process can offer.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
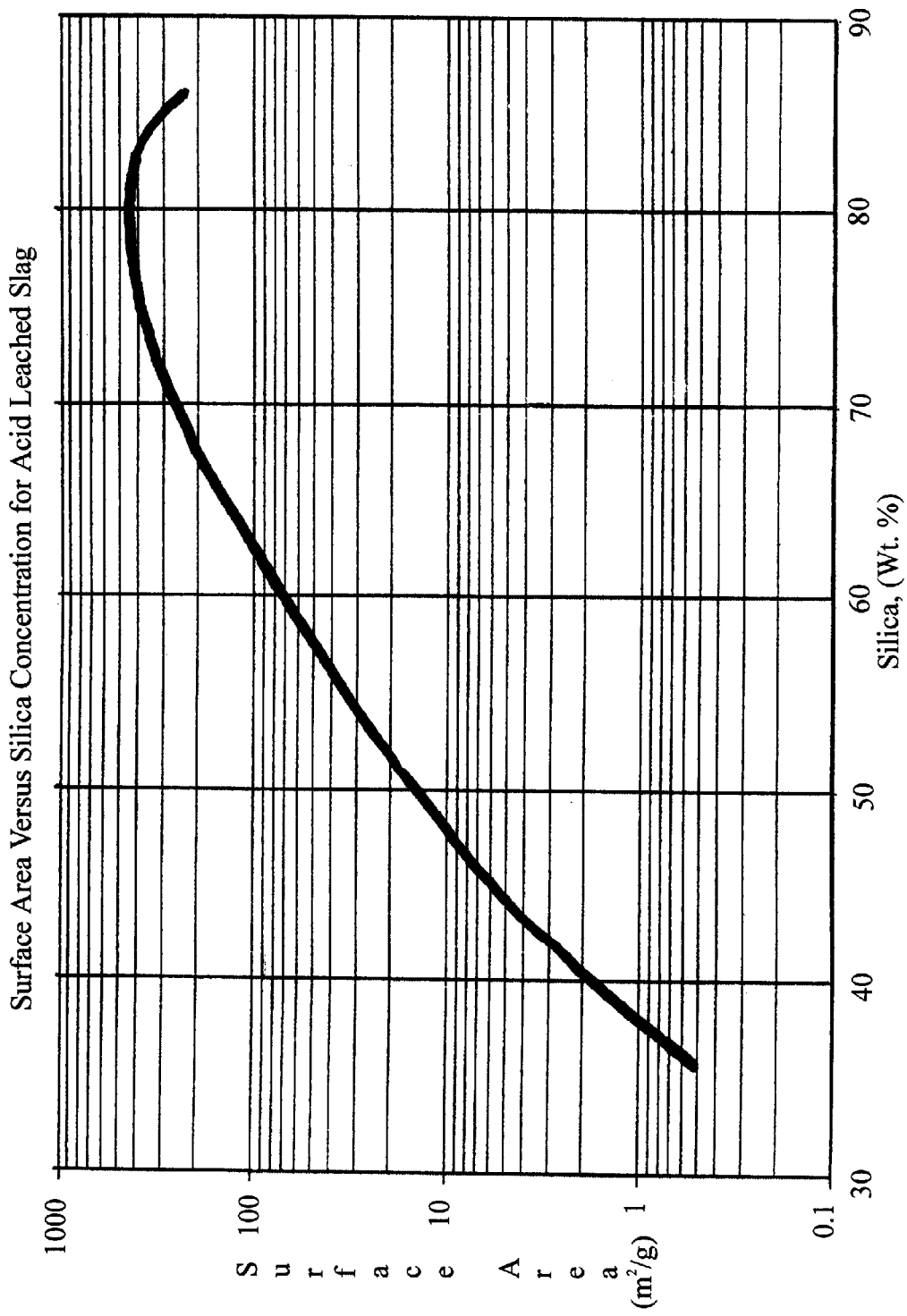
FIG. 1 is a graph of the surface area ($m^2/g$) versus silica concentration (wt %) for acid leached slag.

The basic concept of this invention begins with a solid solution that contains an insoluble and a soluble component. The metal oxides are heated to form a homogeneous melt. After cooling the soluble component is removed leaving the framework containing the insoluble components. In this invention the soluble components are CaO and MgO and the insoluble components are $SiO_2$, $Al_2O_3$, $TiO_2$, and $Fe_2O_3$. By altering the composition of the insoluble components a catalyst with desirable selectivity and activity may be found.

In accordance with the present invention, one way of forming a network containing insoluble components is by taking a preexisting solid solution containing all the desired components and then removing the undesired components in a controlled and selective manner. Blast furnace slag is a solid solution with a chemical composition based on $CaO+MgO+SiO_2+Al_2O_3=100\%$.

|  | CaO | MgO | $SiO_2$ | $Al_2O_3$ |
|---|---|---|---|---|
| Mean Wt. % | 40.8 | 10.1 | 37.8 | 11.3 |
| Standard Deviation % | 4.6 | 4.4 | 2.6 | 2.8 |

Chemical concentrations less than 1% include oxides of iron, potassium, sodium, titanium, and elemental sulfur. Undesired components of the slag are selectively leached out by the controlled addition of acid. The object of the present invention is to produce a residual silica alumina framework having controlled micro-porosity with surface areas an order of magnitude greater (average BET surface area in a range of from 54 to 474 m2/g). To accomplish this, the present invention is a selective process for slowly leaching undesired metal oxides in a controlled fashion so as not to dissolve the silica or alumina. Otherwise, if silica or alumina were to be dissolved, the residual framework would not have the requisite porosity, internal surface area or catalytic activity of the present invention. The selective leaching of the present invention is accomplished by maintaining control over variables such as temperature, rate of addition, concentration of the slag in the slurry, and type/concentration of the acid. The "selective leaching" according to the present invention means that a hierarchy of dissolution occurs. Specifically, the hierarchy begins with MgO, progresses to CaO, and is followed by $Al_2O_3$. However, if the rate of acid addition is too quick alumina may dissolve (see example 11 below). This is an undesirable result because the remaining silica has no acid sites or catalytic activity. The foregoing is not taught or suggested in the prior art. As seen in the following test examples, the controlling variables are preferably maintained within the following preferred parameter ranges:

1. Temperature during leaching: Preferably ambient.
2. Rate of addition of acid: Acid may be added dropwise and slowly in order to maximize the removal of CaO and MgO and minimize the removal of $Al_2O_3$. (As shown in Table 10 below, the acid should be added slowly while monitoring the pH to ensure that it does not go below 2.0.)
3. Type of the acid: HCl
4. Concentration of the acid: 37% HCl
5. Concentration of the slag in the slurry: 4% to 10% granulated slag in water.

The foregoing process of selectively leaching soluble metal oxides out from said solid solution by monitoring pH level and gradually adding a controlled amount of reagent over a controlled amount of time so as to maintain the pH level above 2.0 leaves a micro-porous framework with a maximum BET surface area. In fact, a surface area of 474 m2/g can be achieved by maintaining the following optimal parameters: Acidity 537.2, Acid/slag (wt. %) 2.23, Si/Al (wt. %) 4.66; CaO (wt. %) 0.94. Of course, all of the foregoing variables, when controlled within confined parameters, will influence the selectivity of the process and efficacy of the result. In accordance with the following examples, a usable BET surface area in a range of from 54 to 474 m2/g is achieved by varying the parameters somewhat.

EXAMPLES 1) 20 g of granulated slag (2 microns or 10,000 Blaine, Base A) was added to 500 g of water. 38 g of 37% HCl was added to the slag slurry drop wise over a period of four hours while stirring. The solution turned black and had an odor. The material was filtered and washed with water 3 times before drying. The chemical composition of the starting material (Base A) and the product (Sample A) is shown in Table 1. The alumina and iron did not leach out; however, some silica was apparently removed.

TABLE 1

| | Mean Wt. % of: | | | | | | | |
|---|---|---|---|---|---|---|---|---|
| | $SiO_2$ | $Al_2O_3$ | $Fe_2O_3$ | CaO | MgO | S | $Na_2O$ | $K_2O$ |
| Base A | 35.81 | 10.83 | 1.069 | 39.10 | 12.20 | 0.836 | 0.179 | 0.246 |
| Sample A | 50.14 | 20.98 | 1.946 | 21.46 | 6.13 | 0.539 | 0.153 | 0.168 |

Example 1 demonstrates that a hierarchical leaching exists (where components leached out one-by-one) when the acid is slowly added to the slag. As can be seen in Table 1, the concentrations of CaO and MgO decreased causing the concentrations of the components that did not leach out to increase (for example, $SiO_2$, $Al_2O_3$ and $Fe_2O_3$). Mass balance calculations from this example contributed to the order of leachability set forth above. It was noted in this example that some silica had apparently leached out (perhaps as calcium silicate). It was found (and will be shown) in the subsequent examples that this situation can be avoided by controlling (diluting) the acid concentration.

2) 50 g of granulated slag (7 microns or 5,000 Blaine, Base B) was added to 500 g of water resulting in a pH of 10.8. 30 g of 37% HCl dropped the pH to 4.5, however, the solution returned to pH of 6.75 within minutes and turned black. 45 g of acid was further added for a total of 75 g. Some bubbles appeared and the solution turned gray. The pH dropped to 2.87, then rose to 3.05 (buffering effect caused by CaO). Black chunks in the solution and a gelatinous white top were observed and the slurry would not settle well. The slurry was boiled for 1 hour and an odor was present. The slurry was filtered hot; pH was 5.60. The sample was washed with water until pH was near 7. The chemical composition of the starting material (Base B) and the product (Sample B) is shown in Table 2.

TABLE 2

| | Mean Wt. % of: | | | | | | | |
|---|---|---|---|---|---|---|---|---|
| | $SiO_2$ | $Al_2O_3$ | $Fe_2O_3$ | CaO | MgO | S | $Na_2O$ | $K_2O$ |
| Base B | 35.69 | 10.71 | 1.695 | 39.05 | 12.20 | 0.761 | 0.164 | 0.262 |
| Sample B | 57.52 | 24.64 | 3.411 | 11.45 | 2.47 | 0.308 | 0.003 | 0.203 |

The moles of acid correspond to the moles of CaO and MgO removed. The order of increasing solubility is Al<Fe<Si<<K<S<<Ca<Mg. Example 2 shows the importance of slowly leaching due to the buffered solutions and the time it takes for equilibria to be established Slag in the water has a natural alkali pH of 10.8. As concentrated acid is added drop wise at the rate of one drop per minute for 10 minutes while stirring, the pH decreases try 4.5 only to rise back to 6.75 within minutes. Further addition of acid (drop wise) causes physical changes to occur as the different components are selectivity leached out. These observations are recorded in this example. The slurry was boiled to accelerated the process. The mass balance in this example shows that more of the CaO and MgO and less of the $Al_2O_3$ was leached out than in example 1.

3) 40 g of granulated blast furnace slag (7 microns or 5,000 Blaine, Base C) was added to 400 g of water. After the slurry was well dispersed 60.8 g of 37% HCl was added. The material formed curds and then turned gray with black lumps. After 1 hour and 20 minutes the pH was 3.7 and the sample smelled like $H_2S$. 28.5 g of HCl was added for a total of 89.3 g of HCl or 0.9065 moles (13.3% excess acid to remove CaO and MgO); pH was 1.42. The slurry contained large black specks, but was very fluid. The solution was boiled for 1 hour. Insoluble material was washed and filtered 7 times, then dried at 130° C. The material held a great deal of moisture (>80%) indicating high porosity. The chemical composition of the starting material (Base C) and the product (Sample C) is shown in Table 3.

TABLE 3

| | Mean Wt. % of: | | | | | | | |
|---|---|---|---|---|---|---|---|---|
| | $SiO_2$ | $Al_2O_3$ | $Fe_2O_3$ | CaO | MgO | S | $Na_2O$ | $K_2O$ |
| Base C | 36.27 | 10.75 | 0.995 | 37.34 | 11.92 | 0.696 | | 0.270 |
| Sample C | 80.35 | 17.25 | 0.960 | 0.94 | 0.38 | 0.065 | <0.01 | 0.055 |

Essentially, all the CaO, MgO, S, $Na_2O$, and $K_2O$ dissolved. Some of the iron and alumina dissolved which explains this buffering effect which was observed. Example 3 shows that when the acid is added more quickly (60.8 g drop wise in 1 hour 20 minutes) even with stirring the $Al_2O_3$ content was reduced but not as much as $Fe_2O_3$ was reduced. This demonstrates that $Fe_2O_3$ is leached out preferably over $Al_2O_3$ but that faster addition of acid makes the process less selective because some $Al_2O_3$ did leach out.

4) 40 g of Base C was added to 400 g of water. The slurry was stirred and the metallic iron was removed magnetically. The X-ray chemical analysis showed that 60% of the iron could be removed in this fashion. The other 40% is probably in the oxide form. The chemical composition of the starting material (Base C) and the product (Sample D) is shown in Table 4.

TABLE 4

| | Mean Wt. % of: | | | | | | | |
|---|---|---|---|---|---|---|---|---|
| | $SiO_2$ | $Al_2O_3$ | $Fe_2O_3$ | CaO | MgO | S | $Na_2O$ | $K_2O$ |
| Base C | 36.27 | 10.75 | 0.995 | 37.34 | 11.92 | 0.696 | 0.190 | 0.270 |
| Sample D | 36.21 | 10.79 | 0.405 | 37.19 | 12.03 | 0.680 | 0.181 | 0.266 |

Example 4 simply shows that slag contains metallic iron in addition to iron oxide and that the metallic iron can be removed magnetically. Removal of metallic iron this way reduces the consumption of acid in the process.

5) 60 g of granulated blast furnace slag (Base C) was added to 400 g of water. Iron was removed magnetically as in the previous example and the remaining material was called Base D. When HCl was added to the solution containing Base D (in sufficient quantity to leach half of the CaO and MgO) hard dense black specks formed at the bottom. Solution was not boiled. Chemical analysis indicated that this black material (Sample E) was not well leached. The remainder of the slurry was correspondingly over-leached (Sample F). Therefore, stirring is probably important to maintain a homogeneous mixture. The chemical composition of the starting material (Base D) and the products (Sample E and F) is shown in Table 5.

TABLE 5

| Mean Wt. % of: | $SiO_2$ | $Al_2O_3$ | $Fe_2O_3$ | CaO | MgO | S | $Na_2O$ | $K_2O$ |
|---|---|---|---|---|---|---|---|---|
| Base D | 36.53 | 10.86 | 0.375 | 37.82 | 12.20 | 0.684 | 0.184 | 0.272 |
| Sample E | 56.97 | 17.08 | 0.604 | 18.82 | 5.72 | 0.513 | 0.089 | 0.200 |
| Sample F | 86.11 | 11.58 | 0.399 | 1.28 | 0.44 | 0.158 | 0.166 | 0.032 |

Example 5 shows what happens when the acid is added all at once and without stirring as in the prior art Elattar process (one step non-selective leaching). Selective leaching does not occur and the final product is not homogeneous as shown by samples E and F.

6) Surface areas (SA m²/g) and chemical analyses for selected materials are shown in Table 6 and in FIG. 1. Maximum surface area is realized when nearly all the CaO and MgO has been removed, but before any $Al_2O_3$ has been leached out.

TABLE 6

| Mean Wt. % of: | $SiO_2$ | $Al_2O_3$ | $Fe_2O_3$ | CaO | MgO | $SiO_2/Al_2O_3$[1] | SA m²/g |
|---|---|---|---|---|---|---|---|
| Base B | 35.69 | 10.71 | 1.695 | 39.05 | 12.20 | 5.7 | 0.5 |
| Sample B | 57.52 | 24.64 | 3.411 | 11.45 | 2.47 | 4.0 | 50 |

TABLE 6-continued

| Mean Wt. % of: | $SiO_2$ | $Al_2O_3$ | $Fe_2O_3$ | CaO | MgO | $SiO_2/Al_2O_3$[1] | SA $m^2/g$ |
|---|---|---|---|---|---|---|---|
| Sample C | 80.35 | 17.25 | 0.960 | 0.94 | 0.38 | 8.0 | 442 |
| Sample F | 86.11 | 11.58 | 0.399 | 1.28 | 0.44 | 12.6 | 226 |

[1]Mole ratio

Example 6 shows the advantage of selectivity leaching the slag. As the CaO and MgO components are removed while preserving $Al_2O_3$ the surface area increases (see samples B and C). However, when the $Al_2O_3$ begins to be leached out the surface area decreases (sample F).

7) 40 g of granulated blast furnace slag (7 microns) was added to 260 g of water containing 1 g of 37% HCl. 20 g of acid was added (one gram at a time) until the pH remained below 7. The metallic iron was then removed magnetically. Acid was added to reach pH of 2.7. The solution was later boiled for 90 minutes, but the pH did not change. The average particle size of the material grew from 7 to 53 microns. This demonstrates that average particle size can be controlled early on during the acid treatment and pH is undoubtedly important in doing so. The chemical composition of the starting material (Base D) and the product (Sample G) is shown in Table 7.

TABLE 7

| Mean Wt. % of: | $SiO_2$ | $Al_2O_3$ | $Fe_2O_3$ | CaO | MgO | S | $Na_2O$ | $K_2O$ |
|---|---|---|---|---|---|---|---|---|
| Base D | 36.53 | 10.86 | 0.375 | 37.82 | 12.20 | 0.684 | 0.184 | 0.272 |
| Sample G | 64.49 | 31.04 | 0.343 | 3.23 | 0.69 | 0.066 | 0.145 | 0.143 |

Example 7 shows that adding the slag to an acidic solution; prevents the slag from ever experiencing an alkali solution (example 2 slag in water results in a pH of 10.8). By adding one grain of acid every 1 minute to a stirred slurry while maintaining the pH below 7 and then adding one gram of acid every 10 minutes to a pH of 2.7 prevented any $Al_2O_3$ from being leached out. The solubility of $Al_2O_3$ is very much less than that of CaO or MgO at pH 2.7 and this is indicated by the high $Al_2O_3$ concentration in sample G.

8) 40 g of air cooled blast furnace slag (Base E) was added to a solution of 400 g of water containing 88.5 g of 37% HCl. The solution was boiled and the remains were filtered and washed until the filtrate was pH neutral. This experiment showed that air cooled slag, which is crystalline, can be acid leached as easily as water quenched slag which is amorphous. However, in this case it appears some of the silica leached out. The chemical composition (wt. %) of the starting material (Base E) and the product (Sample H) is shown in Table 8.

TABLE 8

| Mean Wt. % of: | $SiO_2$ | $Al_2O_3$ | $Fe_2O_3$ | CaO | MgO | S | $Na_2O$ | $K_2O$ |
|---|---|---|---|---|---|---|---|---|
| Base E | 36.79 | 10.31 | 0.489 | 37.58 | 12.62 | 0.759 | 0.266 | 0.350 |
| Sample H | 69.93 | 25.54 | 0.633 | 2.17 | 1.19 | 0.317 | 0.068 | 0.154 |

Example 8 demonstrates that selective leaching also applies to crystalline slag as well as amorphous slag. This observation is not intuitive because crystalline materials generally are not as leachable as amorphous materials. In this example acid is added to a stirred slurry of air-cooled crystalline slag drop wise over a period of eight hours.

Figure 2:
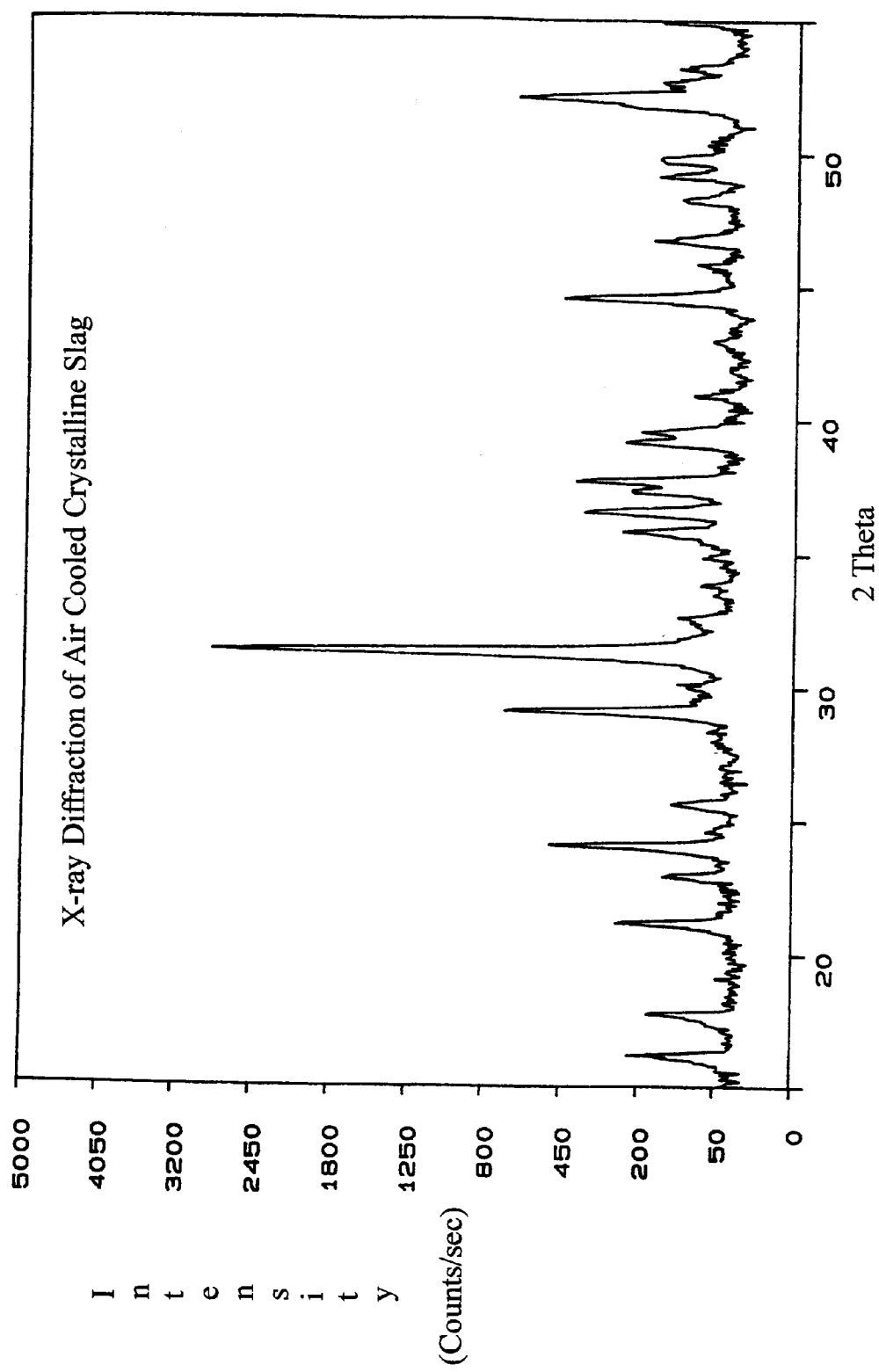
FIG. 2 shows the X-ray diffraction pattern of air cooled crystalline slag.
Figure 3:
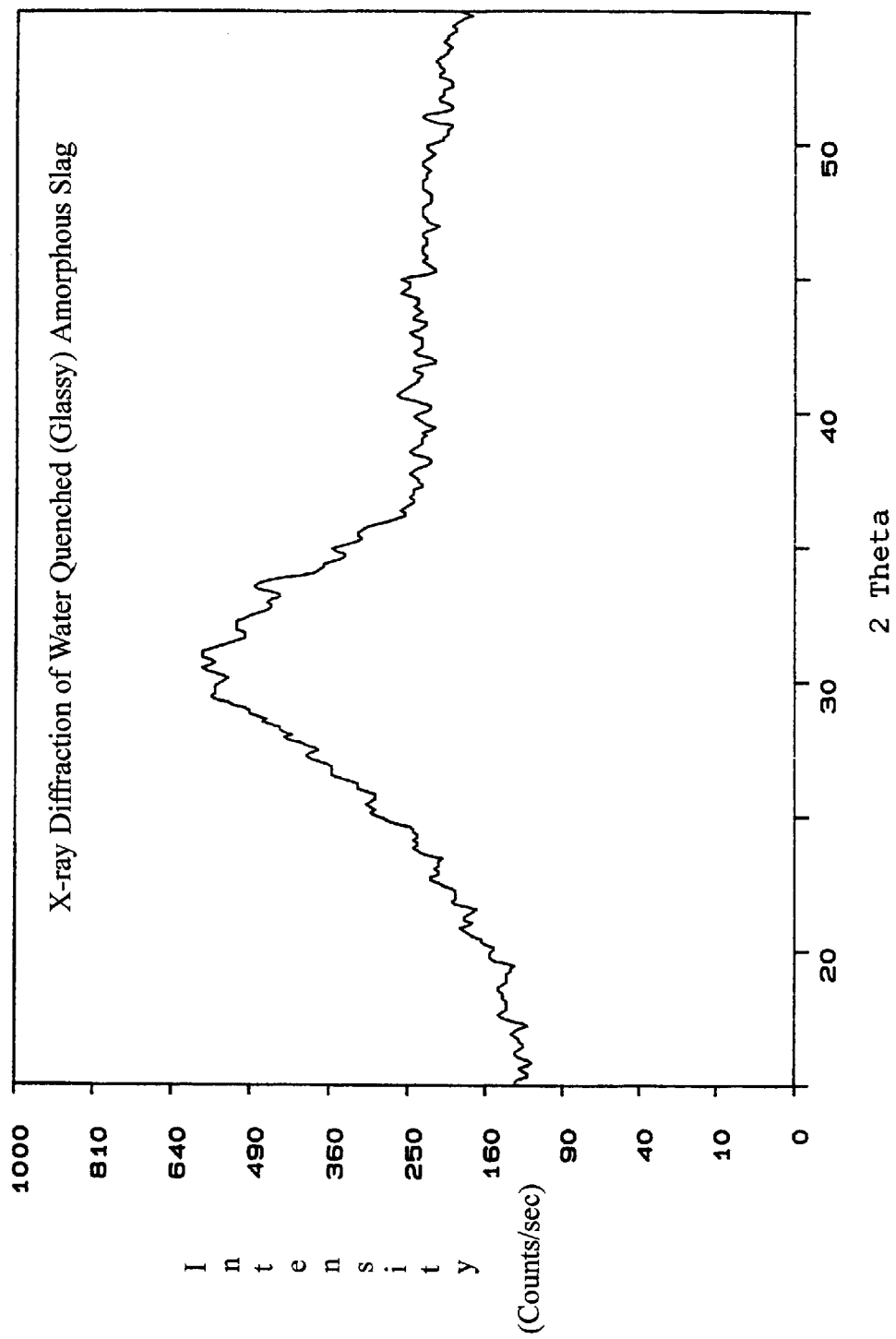
FIG. 3 shows the X-ray diffraction pattern of water quenched (glassy) amorphous slag.

9) Various amounts of 37% HCl were added to 400 g of water to which 10 g of slag (7 microns) was added. One purpose of this experiment was to document the decrease in bulk density (increase porosity) as CaO and MgO were removed. Another purpose of the experiment was to demonstrate that similar results were obtained from chemically identical starting material regardless if it was crystalline or amorphous slag (see FIGS. 2 and 3 and Table 9). As expected the slurries were highly buffered as can be shown by their equilibrium pH.

TABLE 9

| | pH[1]/bulk density (g/cm³)/% recovery[2] | |
|---|---|---|
| g of 37% HCl/g of slag | Crystalline[3] | Amorphous[4] |
| 0 | 8.13/1.153 | 7.42/1.127 |
| 1.50 | 3.26/0.792/40 | 3.15/0.899/41 |
| 2.00 | 3.03/0.567/20 | 3.01/0.716/18 |
| 2.25 | 2.82/0.314/9.0 | 2.65/0.448/7.6 |
| 2.50 | 1.60/0.168/4.5 | 1.35/0.229/4.6 |
| 3.00 | 0.99/0.167/4.2 | 0.83/0.218/4.0 |

[1]Equilibrium pH after 24 hours.
[2]Weight % of product that did no dissolve and was recovered.
[3]Crystalline slag contains calcite and melilite which is a solid solution of gehlenite $Ca_2AlSiO_{5.5}$ and akermanite $CaMgSi_2O_6$. See FIG. 2. Bulk density 1.153 g/cm³.
[4]Amorphous slag containing <3% merwinite $Ca_3MgSi_2O_8$ and a trace of calcite. See FIG. 3.

Example 9 shows the different physical properties of leached slag by adding increasing amounts of acid drop wise at a rate of 4 grams per hour to a stirred slurry.

10) 150 g of slag (80 microns) was added to 1569 g of water to which 861 g of acid solution containing 270 g of 37% HCl was added dropwise at ambient temperature. The equilibrium pH was 2.83 and the solution was colloidal. The leached slag was washed to pH 6.5 and had a bulk density of 0.801.

150 g of slag (80 microns) was leached as above but at 90° C. Upon cooling, the equilibrium pH was 2.74 and the solution was clear. The leached slag was washed to pH 6.5 and had a bulk density of 0.869.

The leached slag that was heated contained more CaO and less $Al_2O_3$ than the leached slag that remained ambient which is consistent with the observed bulk density. Apparently, heating causes the leaching process to be much less selective and is therefore not preferred.

Example 10 shows the effect of applying heat to the selective process. Here, acid was added at a rate of 40 grams per hour to a stirred slurry in both cases. The sample which had heat applied during the leaching process contained less $Al_2O_3$. Thus, heat accelerates the leaching process thereby making the process less selective.

11) 190 g of slag (80 microns) was found to have a bulk density of 1.489 g/cm³ and a skeletal density of 2.586 g/cm³ was added to 3,500 g of water. 36 g of 37% HCl was added dropwise over a period of 6 hours. The solution had a pH of 4.0 before the slag was washed to a pH of 6.02. The slag was then dried at 140° C. Half of this slag was then added to 413 g of water and leached with 7.6% acid solution containing 136 g of 37% HCl. The acid was added dropwise (~1.8 g of acid as HCl/hour). The pH was not allowed to go below 3.0. The other half of this slag was then added to 413 g of water and leached with 7.6% acid solution more quickly (within 2 minutes) as shown in Table 10.

TABLE 10

| Time (minutes) | Grams of 37% HCl in system | pH |
|---|---|---|
| 0 | 0 | 5.88 |
| 0.5 | 44.6 | 1.80 |
| 1 | 65.9 | 1.17 |
| 1.5 | 90.3 | 1.05 |
| 2 | 136 | 0.91 |
| 4 | 136 | 1.60 |
| 8 | 136 | 2.70 |
| 28 | 136 | 3.28 |
| 88 | 136 | 3.26 |
| 360 | 136 | 3.30 |

Even though the amount of acid to slag was the same in both cases the slag leached slowly contained more $Al_2O_3$ had a bulk density of 0.935 whereas the slag leached quickly had a bulk density of 0.739. This experiment demonstrates that the preferred method of acid addition should be slow in order to maximize the removal of CaO and MgO and minimize the removal of $Al_2O_3$.

Example 11 shows that slow addition of acid results in a more selective leaching process as indicated by the presence of more $Al_2O_3$. Table 10 shows that even when acid is added quickly (within 2 minutes) that leaching and final equilibrium is not reached until hours later. The lowest the pH got when acid was added slowly was 4.0 (too high to leach $Al_2O_3$) compared to when acid is added quickly and pH reached 0.91 which could easily dissolve $Al_2O_3$.

12) Leached slag has many other properties that one would expect from a silica/alumina material high in surface area, (e.g., adsorption and ion exchange characteristics). Leached slag also has catalytic properties as would be expected from a material high in acidity. Below, in Table 11, ammonia TPD data demonstrating that the acidity of leached slag as related to surface area is shown.

TABLE 11

| Surface Area[1] | Acidity[2] | Acid/slag | Si/Al | CaO(wt. %) |
|---|---|---|---|---|
| 54 | 0 | 1.50 | 2.33 | 11.45 |
| 86 | 185.8 | 1.94 | 2.09 | 3.23 |
| 203 | 233.6 | 2.08 | | |
| 337 | 347.8 | 2.21 | 4.65 | 2.17 |
| 474 | 537.2 | 2.23 | 4.66 | 0.94 |

[1]BET surface area ($m^2$/g) of leached slag.
[2]Acidity range of temperature 100–600° C. μmol $NH_3$/gram of sample maximum peak found at 240° C. in all cases.

Example 12 shows the correlation between selectively leached slag and some physical and chemical properties. Sample with surface area of 54 is sample B from example 2, Table 2. Sample with surface area of 86 is sample G from example 7, Table 7. Sample with surface area of 337 is sample H from example 8, Table 8. Sample with surface area of 474 is sample C from example 3, Table 3.

These samples show that as the acid/slag ratio increases between 0 and 1.94 as the CaO decreases. At higher acid/slag ratios the $Al_2O_3$, begins to be leached out as indicated by the higher Si/Al ratio. Removal of $Al_2O_3$, results in even higher surfaces areas. The removal of $Al_2O_3$ may or may not be desirable depending on the application of the leached product. The point is that controlled selective leaching according to the present invention invokes the hierarchy of dissolution, thereby allowing one the choice and flexibility as no other process can. The hierarchy begins with MgO, progresses to CaO, and is followed by $Al_2O_3$, and the rate of acid addition is slow and controlled so that alumina does not dissolve (thereby depriving the remaining silica has no acid sites or catalytic activity).

It should be noted that the above examples detail the use of HCl to selectively leach undesired components of the slag. However, variables such as temperature, rate of addition, concentration of the slag in the slurry, and concentration of the acid will influence the solubility of the product and hence the selectivity of the process.

Moreover, the type of acid can influence the selectivity of the process, and other acids can be used. For example, in order to obtain a high surface area product containing $SiO_2$ and $Al_2O_3$ the step-wise addition of hydrochloric or nitric acid is preferred.

A single step could be used if acetic acid (a weak acid) were used. This is because MgO and CaO are much more soluble in acetic acid than $Al_2O_3$ or $SiO_2$. Since the solubility of CaO decreases in acetic acid at higher temperatures, the MgO could be selectively leached. This would result in a product with surface area containing $Al_2O_3$, $SiO_2$, and CaO.

If a product containing $SiO_2$ and CaO is desired, then the preferred acid is $H_2SO_4$. Conceivably, a final product with surface area containing any amount of $SiO_2$, $Al_2O_3$, CaO, and MgO could be derived from slag through selective leaching using the appropriate reagent/reagents which could include acids, alkali, solvents, sugars, or salts alone or in combination.

Moreover, the by-products formed according to the selective leaching process may include $CaCl_2$ and $MgCl_2$ which are themselves useful as de-icing agents. As an alternative to blast furnace slag, the inorganic material fly ash may be the subject of selective leaching of metal oxides as set forth above.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A process for selective leaching of metal oxides from inorganic material, comprising the steps of:
   forming a solid solution from said inorganic material, said solid solution containing an insoluble component and soluble metal oxides;
   selectively leaching soluble metal oxides out from said solid solution by monitoring pH level and gradually adding a controlled amount of reagent over a controlled amount of time so as to maintain said pH level above 2.0, thereby invoking a hierarchy of dissolution to leave a micro-porous framework with a BET surface area in a range of from 54 to 474 $m^2$/g.

2. The process for selective leaching of metal oxides from inorganic material according to claim 1, wherein said inorganic material is blast furnace slag.

3. The process for selective leaching of metal oxides from inorganic material according to claim 1, wherein said inorganic material is fly ash.

4. The process for selective leaching of metal oxides from inorganic material according to claim 1, further comprising the steps of heating said solid solution to form a homogeneous melt, and cooling the solid solution prior to said step of gradually adding reagent to selectively leach the soluble components.

5. The process for selective leaching of metal oxides from inorganic material according to claim 1, wherein said soluble components are selected from the group consisting of CaO and MgO.

6. The process for selective leaching of metal oxides from inorganic material according to claim 1, wherein the insoluble component of said solid solution is selected from the group consisting of $SiO_2$, $Al_2O_3$, $TiO_2$, and $Fe_2O_3$.

7. The process for selective leaching of metal oxides from inorganic material according to claim 1, wherein said resulting micro-porous framework further comprises a residual silica alumina framework with micro-porosity suitable for use as a catalyst or catalyst support.

8. The process for selective leaching of metal oxides from inorganic material according to claim 1, wherein said step of selectively adding reagent further comprises gradually adding increasing amounts of acid.

9. The process for selective leaching of metal oxides from inorganic material according to claim 8, wherein said step of gradually adding increasing amounts of acid further comprises adding said acid drop by drop.

10. The process for selective leaching of metal oxides from inorganic material according to claim 8, wherein said step of gradually adding increasing amounts of acid further comprises adding said acid gram by gram.

11. The process for selective leaching of metal oxides from inorganic material according to claim 8, wherein said step of gradually adding increasing amounts of acid further comprises monitoring pH concentration and adding said acid to maintain the pH concentration over time.

12. The process for selective leaching of metal oxides from inorganic material according to claim 1, wherein said step of selectively adding reagent further comprises gradually adding increasing amounts of any one selected from the group consisting of acid, alkali, solvent, sugar, salt, and any combination thereof.

\* \* \* \* \*